Figure 2:
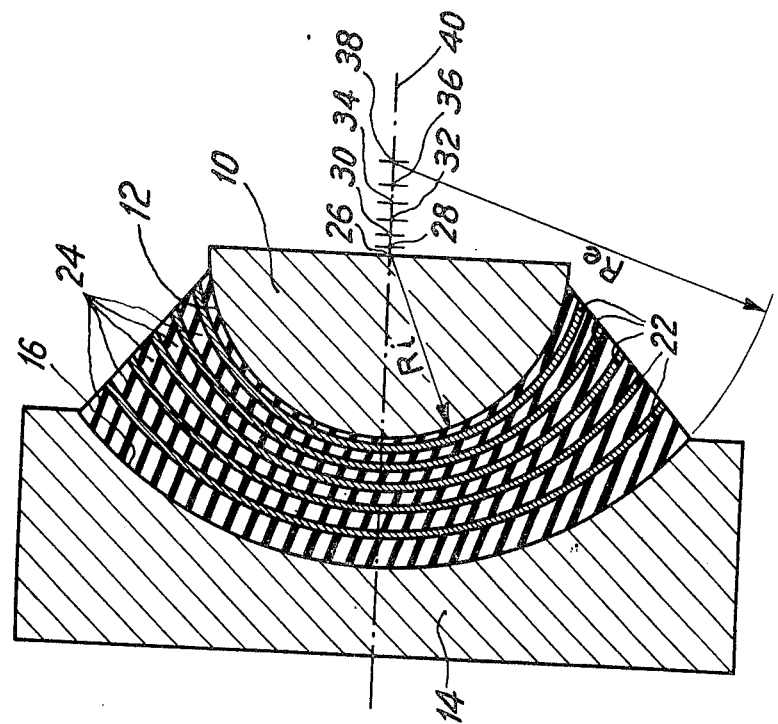

United States Patent [19]

Coffy et al.

[11] 4,419,398

[45] Dec. 6, 1983

[54] LAMINATED STOP OF CURVED SHAPE, PARTICULARLY FOR THE ROTORS OF HELICOPTERS

[75] Inventors: René L. Coffy, Sausset-les-Pins; Jean J. E. Azeau, Gardanne, both of France

[73] Assignee: Societe Nationale Industrielle Aerospatiale, Paris, France

[21] Appl. No.: 331,787

[22] Filed: Dec. 17, 1981

[30] Foreign Application Priority Data

Dec. 26, 1980 [FR] France .............................. 80 27593

[51] Int. Cl.³ .............................................. B32B 1/00
[52] U.S. Cl. .................................... 428/174; 267/152; 428/213; 428/542.8
[58] Field of Search ..................... 428/542.8, 174, 213; 267/152

[56] References Cited

U.S. PATENT DOCUMENTS

| Re. 30,262 | 4/1980 | Schmidt | 267/152 |
| 3,179,400 | 4/1965 | Krotz | 267/57.1 |
| 3,679,197 | 7/1972 | Schmidt | 267/152 |
| 4,084,290 | 4/1978 | Lymar et al. | 428/40 X |

FOREIGN PATENT DOCUMENTS

| 1901774 | 7/1970 | Fed. Rep. of Germany . |
| 2139176 | 1/1973 | France . |
| 2399945 | 3/1979 | France . |
| 2002308 | 2/1979 | United Kingdom . |

Primary Examiner—Henry F. Epstein
Attorney, Agent, or Firm—Armstrong, Nikaido, Marmelstein & Kubovcik

[57] ABSTRACT

The invention concerns laminated stops of curved shapes, particularly for helicopter rotors. The stop has an inner fitting and an outer fitting connected by cupped elements of a resistant and rigid material alternating with layers of flexible material. The layers of flexible material increase in thickness from their centers outwardly, and the mean thickness of the flexible layers increase from the inner fitting to the outer fitting.

6 Claims, 2 Drawing Figures

LAMINATED STOP OF CURVED SHAPE, PARTICULARLY FOR THE ROTORS OF HELICOPTERS

The present invention concerns laminated stops formed by a packed arrangement of alternate layers of flexible material, for example elastomer, and of a resistant and rigid material.

It is known that the ability of a member having a certain thickness of flexible and elastic material to support a compression load can be multiplied by a high factor by incorporating further parallel and separated layers of a non-extensible material. At the same time elasticity is correspondingly reduced in the perpendicular direction. For a given thickness of flexible and elastic material, elasticity under the effects of compression forces diminishes progressively when the number of layers is increased. Furthermore, the compressive load that can be withstood in this direction increases proportionally. The ability of the flexible material to deform rotationally over the length of the layers is not, however, affected to any practical extent by the presence of the intermediate layers of non-elastic material.

It is thus known how to produce stops which offer great resistance to compression in the direction at right angles to the layers, while permitting considerable deformation in the plane of the layers, without the elastic and/or visco-elastic properties of the flexible material undergoing any change.

In view of their excellent properties, such laminated stops are currently used in the various joints of helicopter rotors. However, it has been found that these stops suffer a certain degree of fatigue when they execute combined axial and angular alternating movements. The fatigue behaviour of such a stop depends essentially upon the compression loads and the combined dynamic and static stresses to which it is subjected.

U.S. Pat. No. Re. 30,262 describes a laminated stop of curved shape, the fatigue behaviour of which is excellent. The improved stop described in this patent stems from the discovery of the fact that preferential fatigue occurs in the interior layer of flexible material having the smallest radius. According to this patent, fatigue of this inside layer is reduced by better distribution of the forces applied. Also according to this patent, the layers of flexible material take the form of part-spherical cups, the thicknesses of which increase progressively towards the exterior. This improvement has, in fact, been found to be efficient, and it is advantageous if the laminated stops of the present invention also incorporate it.

It has also been found that not only were the forces not evenly distributed from the interior to the exterior, but also that, in one and the same layer of flexible material, they were not the same at the centre and towards the edges. Analysis of the distribution of the compressive loads due to a crushing force and the extent of the deformation of the flexible material resulting from rotation of the stop shows that the compressive loads are greatest at the centre of the stop and lowest at its periphery, whereas conversely, the extent of deformation is at its greatest at the periphery of the stop and at its lowest at the centre.

The present invention is concerned more particularly with effecting an improvement in the fatigue behaviour of such stops when they are subjected to dynamic stresses, which cause deformation that includes rotation.

Increase in the service-life of the stop is achieved by providing a greater thickness of flexible material in the zones where the degree of deformation is greatest, these zones being the most distant from the axis of rotation. Conversely, in the zones where the degree of deformation is less marked, the thicknesses of the flexible material are smaller so that strength and resistance to compression are increased.

U.S. Pat. No. 3,179,400 describes a torsion spring formed by alternate layers of flexible material and resistant non-elastic material disposed between two fittings of frusto-conical shape. According to this Patent, the inner and outer fittings are parallel and the change in the thickness of the layers of flexible material, which increase from the interior towards the exterior, is achieved by varying the thickness of the layers of rigid material, which thickness diminishes from the interior to the exterior. This arrangement suffers from drawbacks since, for the provision of layers of resistant and rigid material, it calls for the presence of elements having a varying thickness. It is therefore not possible to form the members by a simple cupping operation carried out on sheet-metal.

The present invention eliminates the drawbacks of the device described in this U.S. patent by the use of layers which are substantially in the form of part-spherical cups, the centres of curvature of which are offset along an axis of symmetry of the laminated stop.

According to the invention there is provided a laminated stop of curved shape having an axis of symmetry and comprising an inner fitting having a convex surface; an outer fitting having a concave surface; and, between the inner and outer fittings, layers of flexible material and layers of rigid material alternating therewith; wherein in each axial plane, the mean radii of curvature of the successive layers of flexible material increase more rapidly than the sum of the thicknesses measured from the inner fitting, so that each layer of flexible material has a thickness depending on its extent and which increases in the direction away from the axis.

It is advantageous if the laminated stop of curved shape is of the type wherein the means thicknesses of the successive layers of flexible material are progressively greater in the direction from the inner fitting to the outer fitting.

Further advantage accrues if the convex and concave surfaces of the fittings are portions of spherical surfaces and are arranged about one and the same axis of symmetry, the successive alternate layers also being bounded by portions of spherical surfaces, the centres of these portions of spherical surfaces being arranged progressively closer to the inner fitting, whereas the layers are arranged progressively closer to the outer fitting.

It is advantageous if the layers of rigid material have a constant thickness and if only the layers of flexible material have a variable thickness. Thus, the layers of rigid material can be formed by simply cupping a metal sheet.

Furthermore, it is advantageous if the resistant rigid and non-extensible material of the layers be a metal or a reinforced plastics material, and if the flexible material be an elastomer.

Figure 1:
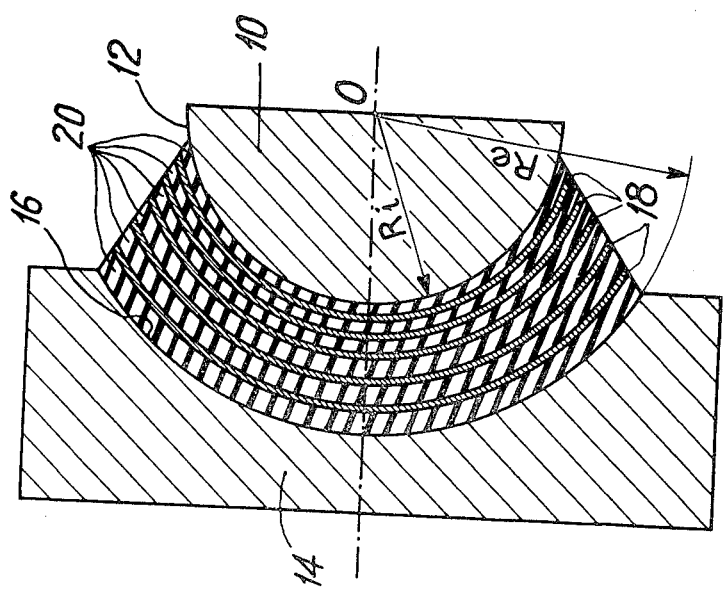

Other features and advantages of the invention will be more clearly seen from the following description, which refers to the attached drawings, in which:

FIG. 1 is an axial section through a known type of laminated stop of curved shape; and FIG. 2 is an axial section through a curved type of laminated stop in accordance with the invention.

FIG. 1 illustrates a known type of curved laminated stop comprising an inner fitting 10 having a hemispherical surface 12 which has a radius Ri. An outer fitting 14 has a concave surface 16 having a radius Re. Alternate layers of resistant and rigid material 18 and of flexible material 20 are packed between the two fittings. The layers of resistant and rigid material 18 are advantageously formed by cupped elements having a relatively small and substantially constant thickness. These elements may be made of steel, for example. However, a plastics material reinforced by glass fibres may be used, for example. The layers 20 of flexible material advantageously consist of an elastomer, and it will be seen that the thickness of these layers increases progressively from the inner fitting 10 to the outer fitting 14. This stop therefore incorporates the improvement previously described by reference to U.S. Pat. No. Re. 30,262.

FIG. 2 illustrates a laminated stop similar to that shown in FIG. 1 but incorporating the improvement in accordance with the present invention. In FIG. 2, the inner fitting 10, having a convex surface 12, and the outer fitting 14, having a concave surface 16, are similar to the corresponding elements of the stop shown in FIG. 1. On the other hand, the alternate layers are different. In fact, they comprise layers 22 of a resistant and rigid material and layers 24 of a flexible material.

The layers 22 of resistant and rigid material are again constituted by cupped elements, advantageously made of steel, and having a substantially constant thickness. However, whereas in the FIG. 1 stop, the centres of curvature of all the cupped elements 18 occur at one and the same point 0, the centres of curvature of the various cupped elements 22 of the Figure arrangement are offset.

More precisely, in FIG. 2, the point 26 represents the centre of curvature of the convex surface of the inner fitting 10. The point 38 represents the centre of curvature of the concave surface of the outer fitting 14. Between these two points, the centres of curvature 28, 30, 32, 34 and 36 of the various cupped elements 22 are staggered so that the spaces separating two cupped elements or one cupped element and the surface of adjacent fitting do not have a constant width. Since the centres of curvature are progressively more widely spaced towards the inner fitting whereas the cupped elements are disposed progressively closer to the outer fitting, the delimited spaces have a minimum width near the axis of symmetry 40 of the stop and a maximum width near the edges. Thus according to the invention, the width of the flexible material is minimal at the place where the compression loads are greatest, and is maximal at the place where the deformations are of maximum amplitude.

The two laminated stops illustrated in FIGS. 1 and 2 were subjected to tests simulating use in a helicopter rotor, that is to say, tests during which the fittings executed alternate combined axial and angular movements relatively to each other. It was found that fatigue behaviour of the stop in accordance with the invention is practically twice as good as that of the laminated stop of the known type.

The inner and outer fittings can be made of any material having a suitable mechanical strength, and they are generally made of metal. The layers of resistant and rigid material consist of a non-extensible material which is usually a metal. The flexible material may advantageously be an elastomer. It is obviously desirable that the elastomer should be bonded by a known medium to the resistant and rigid material of the intermediate cupped elements and of the fittings.

Although is has been indicated that the layers of flexible material were made of an elastomer, the material of the different layers need not, of course, be the same.

Manufacture of the curved laminated stops of the invention does not present any particular technical problem. In fact, manufacture of stops of the conventional type makes use of comb-like devices which support the cupped elements and hold them in position when the elastomer is injected between the cupped elements. During manufacture of the stops in accordance with the invention, only the relative position of the cupped elements is altered, and this can be achieved by a minor adaption of the manufacturing equipment.

It will of course be appreciated that the invention has been described and illustrated merely in a preferred form and that any equivalent technical form of the compound elements could be used without thereby departing from the ambit of the invention.

We claim:

1. A laminated stop of curved shape having an axis of symmetry and comprising an inner fitting having a convex surface; an outer fitting having a concave surface; and, between the inner and outer fittings, layers of flexible material and layers of rigid material alternating therewith; wherein, in each axial plane, the mean radii of curvature of the successive layers of flexible material increase more rapidly than the sum of the thicknesses measured from the inner fitting, so that each layer of flexible material has a thickness which increases in the direction away from the axis.

2. A laminated stop according to claim 1, wherein the mean thicknesses of the successive layers of the flexible material become progressively greater in the direction from the inner fitting to the outer fitting.

3. A laminated stop according to claim 1, wherein the convex surface and the concave surface of the inner and outer fittings respectively are portions of spherical surfaces arranged about said axis of symmetry, and that the successive alternate layers of flexible and rigid material are delimited by portions of spherical surfaces arranged about said axis of symmetry.

4. A laminated stop as claimed in claim 1, wherein the layers of rigid material have a constant thickness, and only the layers of the flexible material vary in thickness.

5. A laminated stop as claimed in claim 1, wherein the rigid material of the layers is a non-extensible material selected from the group consisting of metals and reinforced plastic materials.

6. A laminated stop as claimed in claim 1, wherein the flexible material is an elastomer.

* * * * *